United States Patent [19]
Pierson

[11] Patent Number: 5,107,880
[45] Date of Patent: Apr. 28, 1992

[54] DISK CLEANING APPARATUS

[75] Inventor: Eric D. Pierson, Lincoln, Nebr.

[73] Assignee: Pathway Systems, Inc., Manhattan, Mont.

[21] Appl. No.: 490,134

[22] Filed: Mar. 7, 1990

[51] Int. Cl.⁵ .............................................. B08B 3/02
[52] U.S. Cl. ................................. 134/902; 134/153; 134/200
[58] Field of Search ............... 134/902, 153, 143, 162, 134/200, 157, 155, 154, 149, 99

[56] References Cited

U.S. PATENT DOCUMENTS

| | | | |
|---|---|---|---|
| 3,378,394 | 4/1968 | David | 134/144 |
| 3,479,222 | 11/1969 | David et al. | 134/153 |
| 3,990,462 | 11/1976 | Elftmann et al. | 134/902 |
| 4,015,615 | 4/1977 | Weber | 134/200 |
| 4,202,071 | 5/1980 | Scharpf | 134/153 |
| 4,300,581 | 11/1981 | Thompson | 134/902 |
| 4,489,740 | 12/1984 | Rattan et al. | 134/902 |
| 4,664,133 | 5/1987 | Silvernail et al. | 134/902 |
| 4,674,521 | 6/1987 | Paulfus | 134/902 |
| 4,682,614 | 7/1987 | Silvernail et al. | 134/902 |
| 4,982,753 | 1/1991 | Grebinski, Jr. et al. | 134/902 |
| 5,022,419 | 6/1991 | Thompson et al. | 134/902 |

FOREIGN PATENT DOCUMENTS

| | | | |
|---|---|---|---|
| 0002163 | 1/1977 | Japan | 134/902 |
| 0002164 | 1/1977 | Japan | 134/902 |

*Primary Examiner*—William A. Cuchlinski, Jr.
*Assistant Examiner*—William C. Dowling
*Attorney, Agent, or Firm*—Zarley, McKee, Thomte Voorhees & Sease

[57] ABSTRACT

A disk cleaning apparatus includes an enclosed housing with a door mounted on the forward wall of the housing operable between open and closed positions. In the preferred embodiment, the door is mounted so as to move away from the front wall of the housing, generally parallel thereto, between opened and closed positions. The housing includes an apparatus for spraying fluid on disks located within a disk retaining cradle is powered so as to rotate the disks during the spraying process. A motor mounted within the housing is connected through a drive train in the door to the disk retaining cradle, so as to rotate the cradle. A drive coupler has a forward half operably mounted in the door and connected to the drive train, and a second half operably mounted in the housing connected to the motor, such that rotational energy from the motor will be transmitted through the drive coupler and drive train to the disk retaining cradle when the door is in a closed position. The forward and rearward halves of the drive coupler are separable so as to prevent transmission of rotational energy from the motor when the door is in an open position.

10 Claims, 5 Drawing Sheets

DISK CLEANING APPARATUS

TECHNICAL FIELD

The present invention relates generally to apparatus for cleaning computer memory disks, and more particularly to a front loading disk cleaning apparatus which spins the disks while applying a cleaner solution thereto.

BACKGROUND OF THE INVENTION

Rigid memory disks are one component of conventional computer hard disk subsystems. These disks must be cleaned and chemically treated during the various phases of manufacture and prior to assembly into the hard disk subsystem. Prior art methods of cleaning memory disks have been too slow, too small in capacity, or simply have not given acceptable results.

While spin-type rinser/dryer units are on the market, they are not designed for use with rigid memory disks, but rather for the processing of silicon wafers used in the manufacture of chips and integrated circuits. In general, such prior art rinser/dryer units are typically not sturdy enough to handle the rigors of disk processing. Thus, the disk manufacturer had to settle for a second rate adaptation of a tool not designed for disk processing.

On problem with prior art disk cleaning units, was that such units sprayed the cleaning solution from a manifold located along the edge of the disks towards the center of the disks, while the disks were rotating. Thus, centrifugal force would throw back dirty solution towards the manifold, contaminating the clean solution coming from the manifold.

Another problem with conventional disk cleaning units was the amount of time it required to complete a full clean/rinse/dry cycle. Because centrifugal force would throw solution back towards the spray manifold, a low RPM was required to obtain complete coverage of the solution on the disks. This low RPM thereby required large amounts of time to completely clean, rinse and spin dry the disks.

Prior art disk cleaning units are typically awkward and time consuming to load. This is due in part to the use of a swing type or up and down type door. Conventional disk cleaner doors also limit the capacity of the unit because of the method of inserting and retrieving disks.

Conventional disk cleaning units are also time consuming to maintain, because of the location of the drive components within the interior of the housing. Access to the drive components requires removal of interior parts in many cases, and requires the mechanic to work within a confined space.

It is therefore a general object of the present invention to provide an improved disk cleaning apparatus.

Another object of the present invention is to provide a disk cleaning apparatus which prevents contamination of cleaning solution being applied to the disks.

A further object is to provide a disk cleaning apparatus which permits quick and efficient loading and unloading of the unit.

Still another object of the present invention is to provide a disk cleaning apparatus with drive components which are easily accessible for maintenance.

Yet a further object is to provide a disk cleaning apparatus which is economical to manufacture, simple to use, and refined in appearance.

These and other objects of the present invention will be apparent to those skilled in the art.

SUMMARY OF THE INVENTION

The disk cleaning apparatus of the present invention includes an enclosed housing with a door mounted on the forward wall of the housing and operable between open and closed positions. In the preferred embodiment, the door is mounted so as to move away from the front wall of the housing, generally parallel thereto, between opened and closed positions. The housing has apparatus for spraying fluid on disks located within a disk retaining cradle operably mounted within the housing. The disk retaining cradle is powered so as to rotate the disks during the spraying process. A motor mounted within the housing is connected through a drive train in the door to the disk retaining cradle, so as to rotate the cradle. A drive coupler has a forward half operably mounted in the door and connected to the drive train, and a second half operably mounted in the housing connected to the motor, such that rotational energy from the motor will be transmitted through the drive coupler and drive train to the disk retaining cradle when the door is in a closed position. The forward and rearward halves of the drive coupler are separable so as to prevent transmission of rotational energy from the motor when the door is in an open position.

DESCRIPTION OF THE PREFERRED EMBODIMENT

Figure 2:
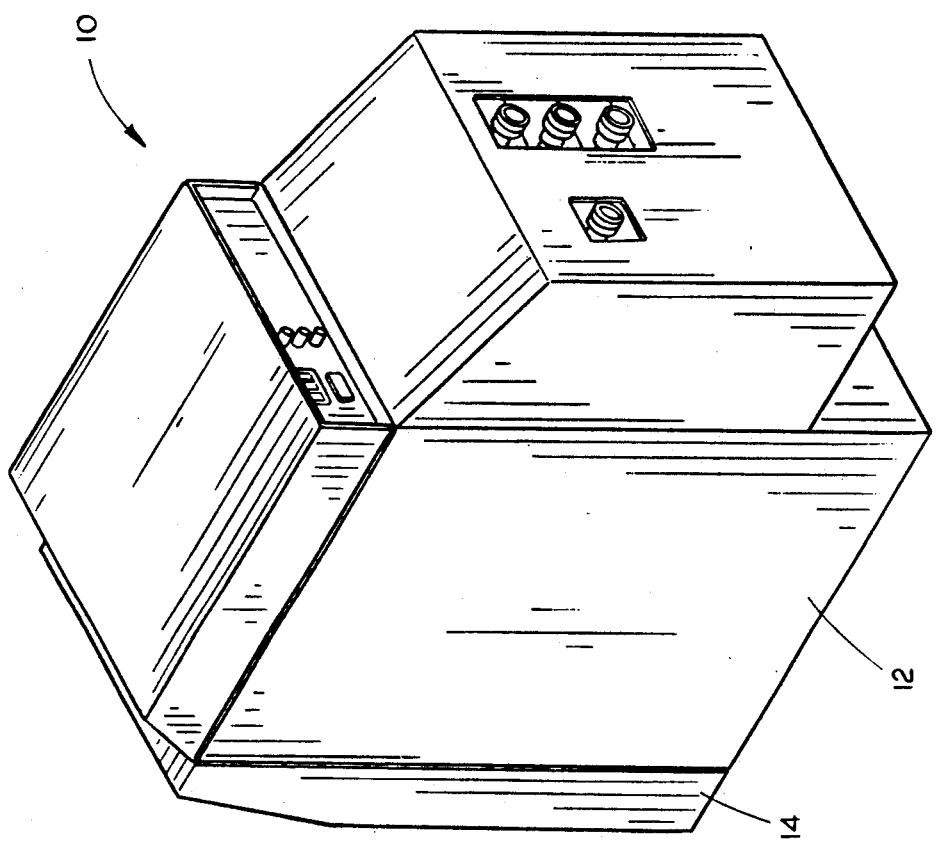
FIG. 2 is a rearward perspective view of the invention.
Figure 1:
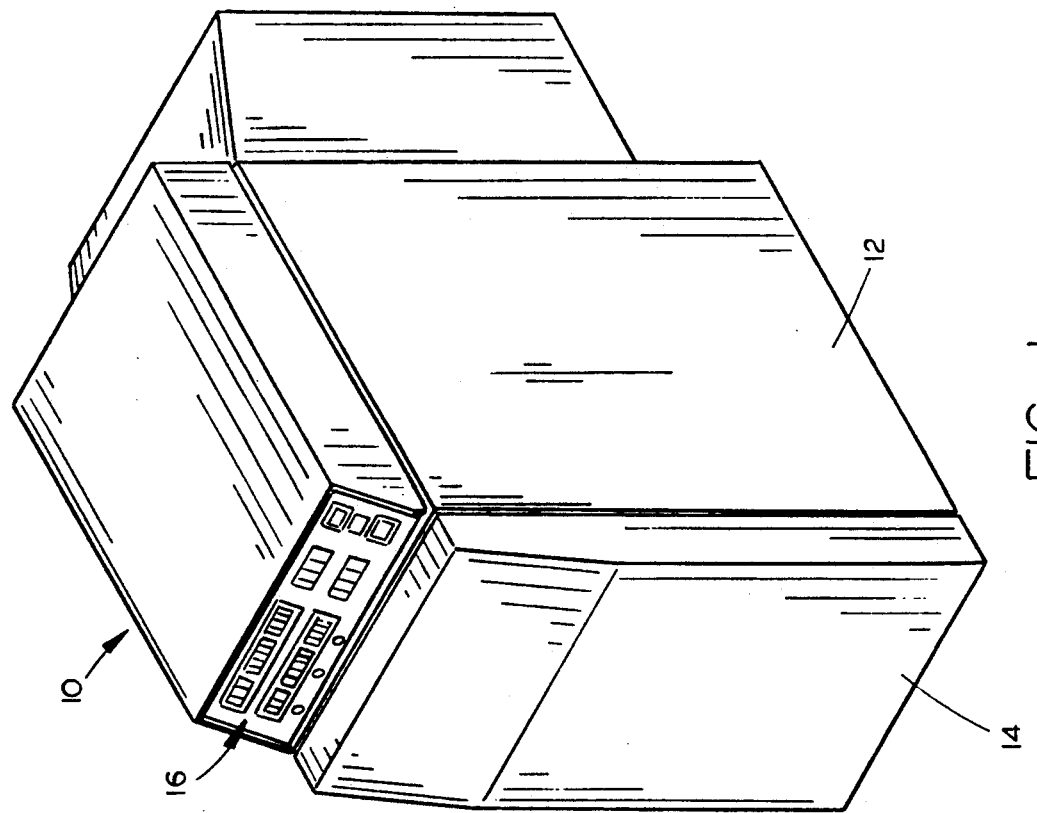
FIG. 1 is a front perspective view of the disk cleaning apparatus of the present invention.

Referring now to the drawings, in which identical or corresponding parts are identified with the same reference numeral, the disk cleaning apparatus of the present invention is designated generally at 10 and includes a housing 12, an operable front door 14 and a control panel 16.

Housing 12 includes a pair of vertical side walls 18 and 20, a front wall 22, rear wall 24, top wall 26 and bottom wall 28. Front door 14 has a front face 30 and a rearward face 32, with a pair of rigid arms 34 projecting horizontally and rearwardly from rear face 32. Arms 34 are channel members, each being slidably mounted on a support strap 36 with housing 12, such that door 14 is slidable towards, and away from, front wall 22 of housing 12. A pair of dual action pneumatic cylinders 38 are mounted parallel and adjacent to support straps 36 in housing 12, and have their push rods 40 connected to front door 14 such that operation of these cylinders will open or close front door 14.

Figure 4:
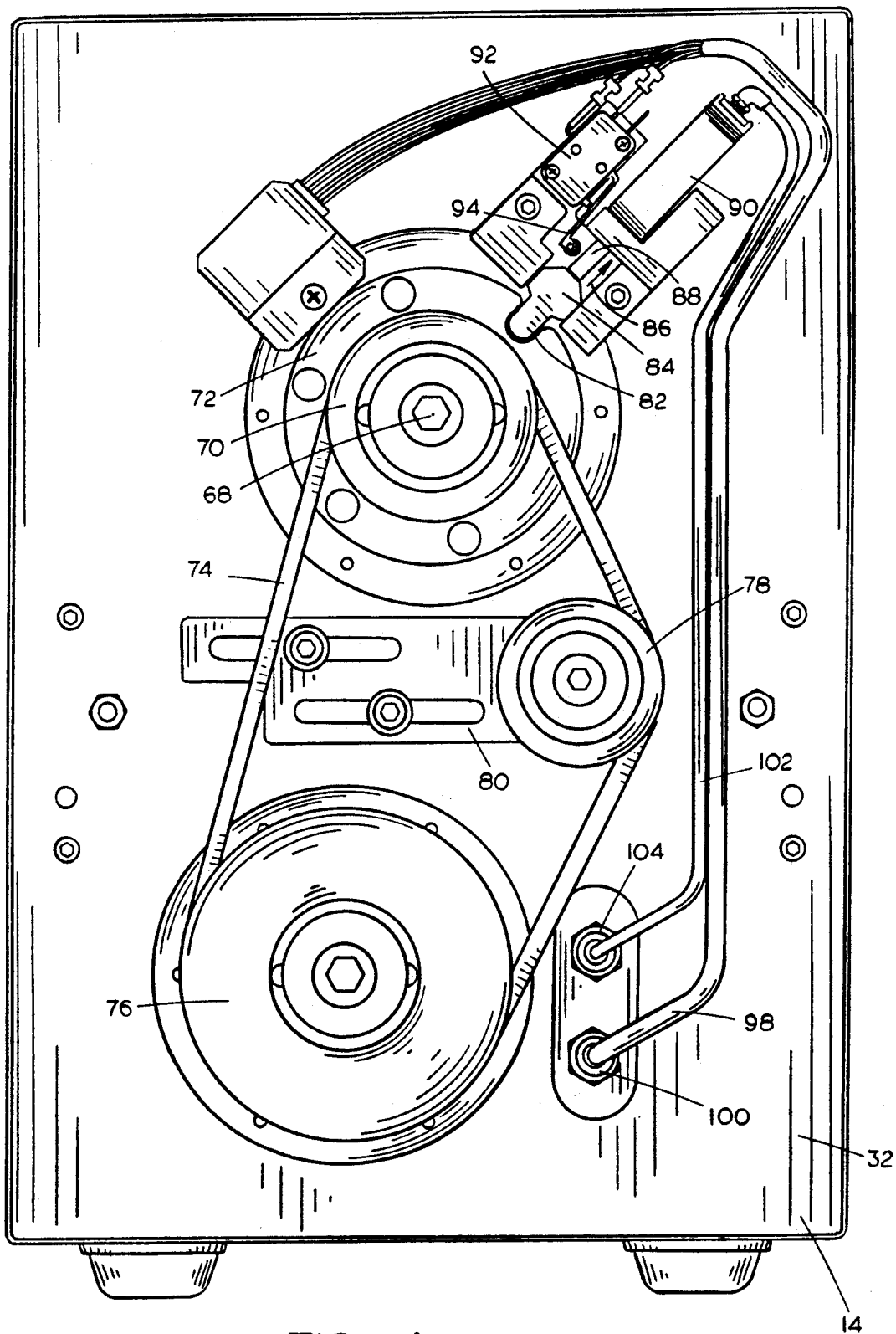
FIG. 4 is a front elevational view of the front door of the disk cleaning apparatus, with the front face removed to view the interior thereof.

A rotatable cradle is designated generally at 42, and will receive a disk rack 44 which retains a plurality of rigid memory disks 46 therein. Cradle 42 will rotate about a longitudinal axis so as to spin disks 46 within housing 12. Cradle 42 includes a circular forward plate 48 rotatably mounted to the rearward surface 32 of front door 14. A series of four projecting arms 50 are mounted in parallel spaced apart orientation around the circumference of the lower half of plate 48, arms 50 each being equidistant from the axis of rotation of plate 48. A circular guide plate 52 is mounted coaxial to forward plate 48 adjacent the free ends of arms 50, as shown in FIG. 4. The free ends 50a of arms 50 project slightly through guide plate 52 so as to be journaled within receiving apertures 54 in a circular rearward plate 56, to be described in more detail hereinbelow. Guide plate 52 is mounted on arms 50 for movement therewith.

Rearward plate 56 is rotatably mounted to an interior wall 58 within housing 12, coaxial with guide plate 52 and forward plate 48. Four projecting arms 60, which are parallel and spaced apart, project horizontally from rearward plate 56 along the circumference of the upper half thereof. Arms 56 and arms 50 are all radially equidistant from the axis of rotation of forward and rearward plates 48 and 56. Arms 60 are slidably mounted through apertures 62 in guide plate 52, and are aligned with receiving apertures 64 in forward plate 48.

Figure 3:
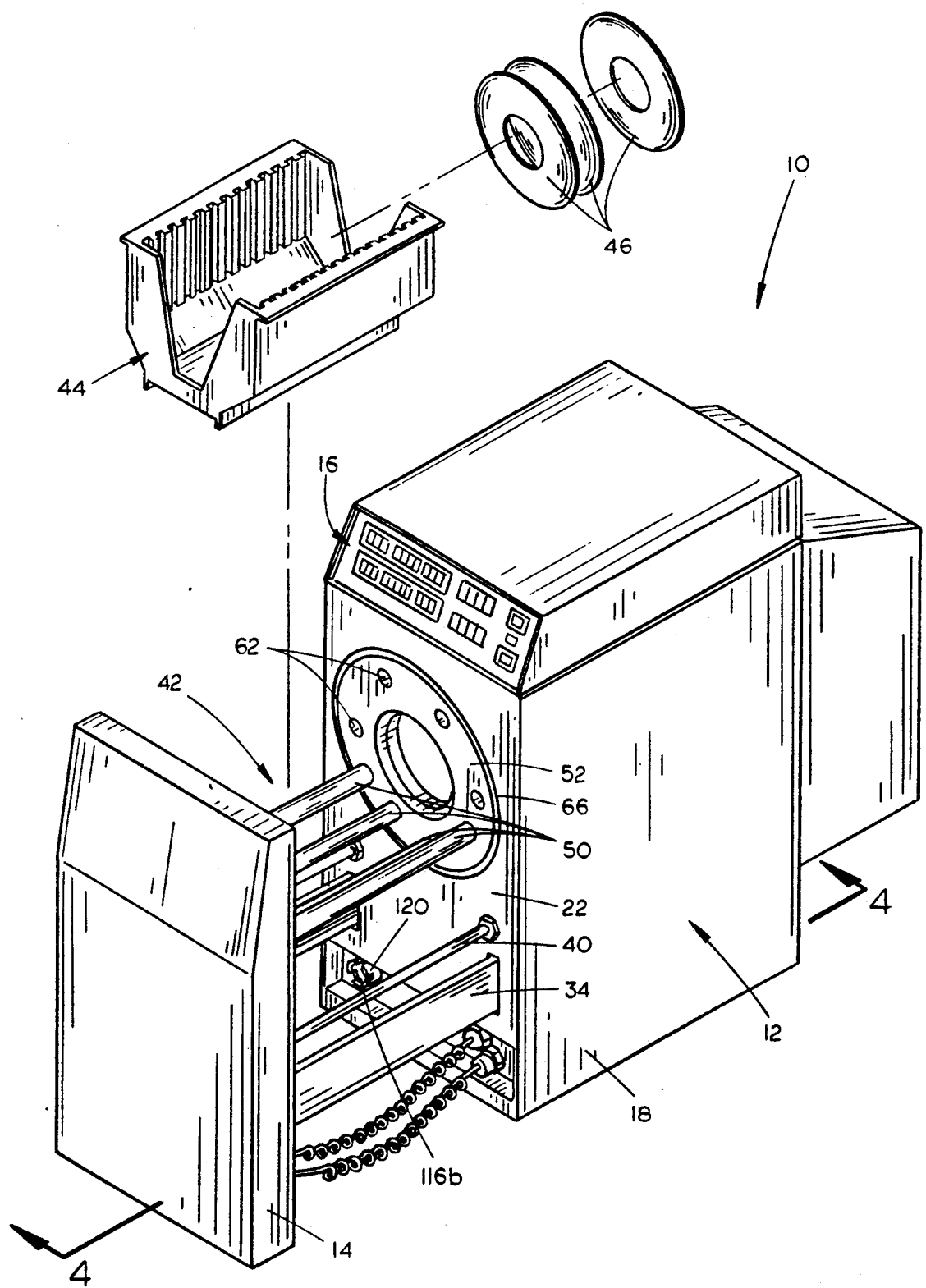
FIG. 3 is a front perspective view with the loading door extended and the disks and disk rack shown in exploded perspective.

Referring now to FIG. 3, a large circular opening 66 is formed in front wall 2 of housing 12, which will allow guide plate 52 to pass therethrough. In FIG. 3, front door 14 is in a fully open position with guide plate 52 located within opening 66. When door 14 is retracted to a closed position, guide plate 52 will slide along arms 60 (see FIG. 4) until the free ends 50a of arms 50 are journaled within receiving apertures 54 in rearward plate 56, and the free ends 60a of arms 60 are journaled within receiving aperture 64 in forward plate 48. Thus, when door 14 is in the closed position, a generally cylindrical cage is formed by arms 50 and 60 which will rotate on its longitudinal axis.

Figure 5:
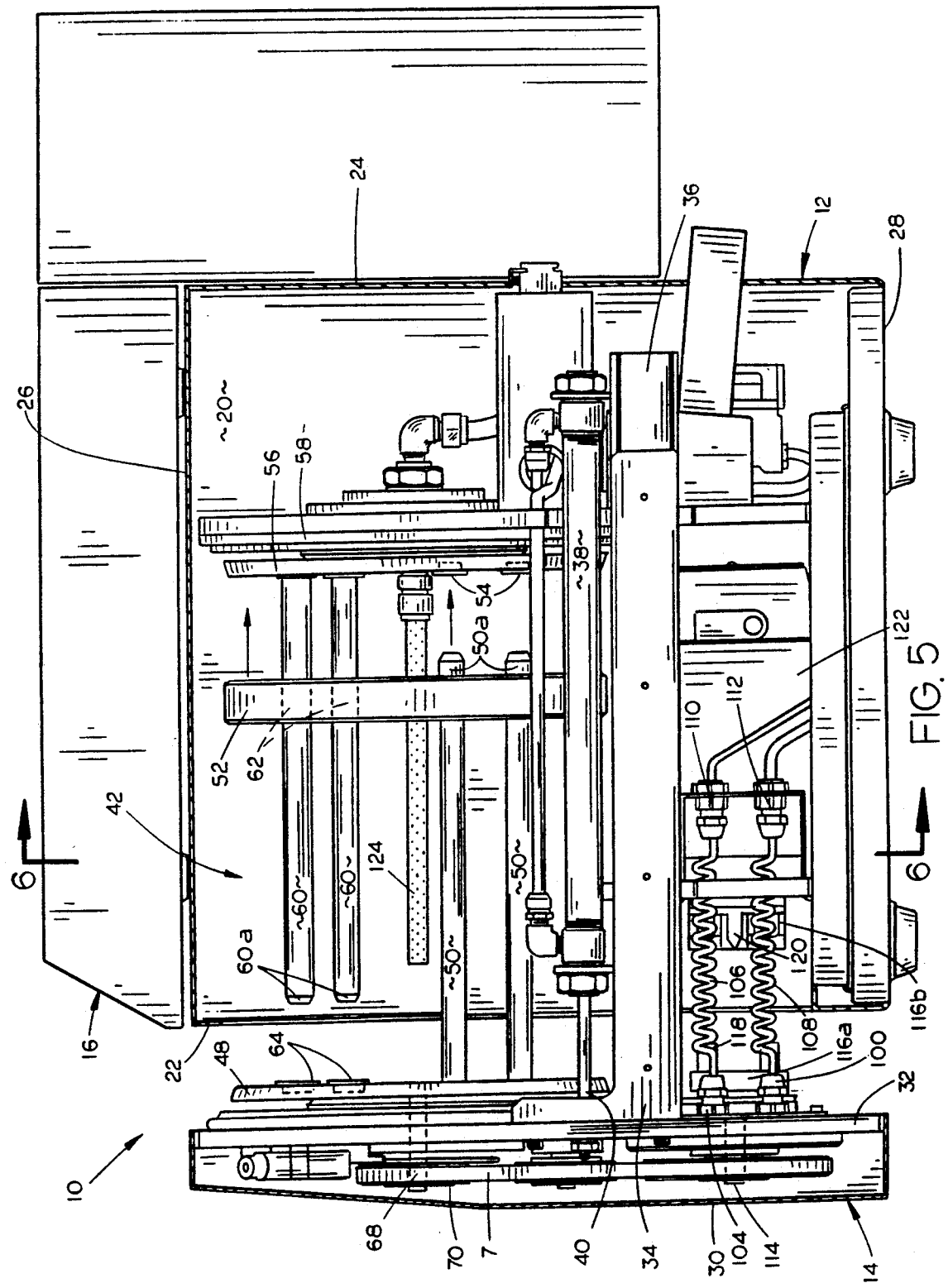
FIG. 5 is a sectional view taken at lines 5—5 in FIG. 3.
Figure 6:
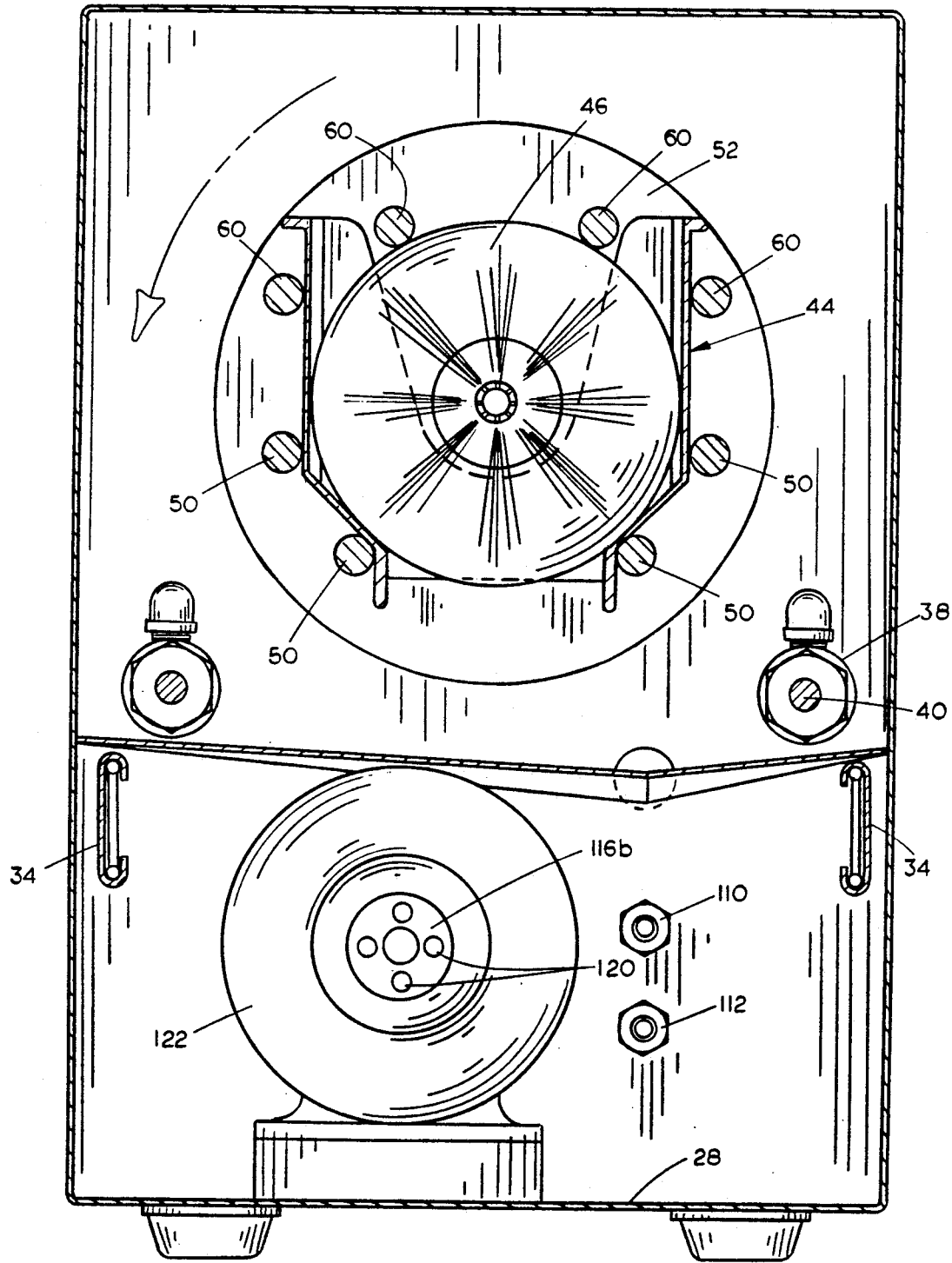
FIG. 6 is a sectional view taken at lines 6—6 in FIG. 5.

In the preferred embodiment of the invention, forward plate 48 is mounted on a rotatable shaft 68 projecting through rearward face 32 into the interior of door 14, as shown in FIGS. 4 and 5. An upper pulley 70 and circular locking plate 72 are mounted to shaft 68, for rotation therewith. A drive belt 74 extends around upper pulley 70 and downward around a lower pulley 76, such that lower pulley 76 will drive upper pulley 70. A tensioner wheel 78 is adjustably mounted via a bracket 80 to door 14, so as to apply tension to drive belt 74 in a conventional fashion.

Circular locking plate 72 has a notch 82 formed in the circumference thereof, which will receive an operable latch 84 which is movable between locked and unlocked positions. FIG. 4 shows latch 84 in the "locked" position, and arrow 86 shows movement of latch 84 to a "unlocked" position. Latch 84 is connected to the push rod 88 of a pneumatic cylinder 90 such that operation of pneumatic cylinder 90 will move latch 84 between the "locked" and "unlocked" positions.

An electronic sensor 92 is mounted adjacent latch 84 with an operable contact 94 located to move between open and closed positions in response to movement of latch 84 between "locked" and "unlocked" positions. Electronic sensor 92 has electrically conductors 96 which are journaled through an electrical conduit 98 to a lower fitting 100 projecting through rearward face 32 of door 14. Pneumatic cylinder 90 has pneumatic conduit 102 extending therefrom and connected to an upper fitting 104 extending through rearward face 32 of door 14.

As shown in FIG. 5, upper and lower fittings 104 and 100 are each connected to coiled extensible conduits 106 and 108, respectively, and are connected to upper and lower fittings 110 and 112, respectively, within housing 12. Upper fitting 110 is connected to a source of pneumatic fluid, and lower fitting 112 is connected to an electrical source, to provide the appropriate pneumatic and electrical power to pneumatic cylinder 90 and electrical sensor 92.

Lower pulley 76 is mounted on a rotatable shaft 114 which extends through rearward face 32 of door 14 and is mounted to one-half 116a of a drive coupler 116. Drive coupler first-half 116a has a plurality of teeth 118 projecting therefrom which intermesh with teeth 120 on drive coupler half 116b, operably mounted to a motor 122 within housing 12. Thus, when the door 14 is opened, coupler half 116a is disengaged from coupler half 116b, so as to prevent the transmission of power from motor 122 to cradle 42. Once door 14 is closed, teeth 118 will intermesh with teeth 120 such that drive coupler 116 will again transmit power from motor 122 through pulleys 76 and 70 to cradle 42.

As an additional safety feature, latch 84 is operable so as to be journaled within notch 82 to prevent rotation of lock plate 72 and pulley 70. Not only will this prevent rotation of cradle 42, but will serve as an index so that cradle 42 is oriented with arms 50 located below arms 60. Since only arms 50 will extend from housing 12 when door 14 is opened, they must be located beneath disk rack 44 and disks 46 to support the same when door 14 is opened.

In operation, front door 14 is opened by extending push rods 40 of pneumatic cylinders 38. Disks 46 are then loaded within disk rack 44, which is placed on arms 50 of cradle 42. Pneumatic cylinders 38 are then activated to retract push rods 40 and close door 14. As door 14 closes, arms 60, extending from rearward plate 56, will project through guide plate 52 into receiving apertures 64 on forward plate 48. Simultaneously, coupler drive halves 116a and 116b will intermesh to permit transmission of power from motor 122 to cradle 42.

Utilizing control panel 16, pneumatic cylinder 90 within door 14 will be activated to move latch 84 and allow locking plate 72 to rotate. The disk cleaning apparatus 10 may then be operated to wash, rinse or dry disks within housing 12. The "wash" cycle of the apparatus will spray cleaning fluid from a spray arm 124 extending through the center of disks 46, as the disks spin within cradle 42. Spray arm 92 may be selectively connected to a source of rinsing fluid to rinse disks 46, as desired. The disks may then be spun at a high RPM in order to dry the disks.

Once the complete cycle has occurred, latch 84 within door 14 will be journaled within notch 82 of locking plate 72 so as to index cradle 42 with arms 50 below arms 60. Door 14 may then be pneumatically opened, disengaging drive coupler half 116a from half 116b, and presenting disks 46 within disk rack 44 on arms 50.

It should be noted that no details have been shown of the control panel housing 126 resting atop housing 12, nor of the connection box 128 mounted to the rearward wall 24 of housing 12. Any conventional connections and control means may be utilized with the apparatus of the present invention.

Whereas the invention has been shown and described in connection with the preferred embodiment thereof, it will be understood that many modifications, substitutions and additions may be made which are within the intended broad scope of the appended claims. Thus, there has been shown and described an improved disk cleaning apparatus which accomplishes at least all of the above-stated objects.

I claim:

1. A disk cleaning apparatus, comprising:
   an enclosed housing having forward and rearward walls;
   a door mounted on the forward wall of said housing operable between open and closed positions;
   said door being mounted so as to move perpendicularly away from the plane of said front wall while remaining generally parallel thereto, when operated to an open position, and mounted so as to seal said housing when moved to the closed position;
   means in said housing for spraying fluid on disks selectively located within the housing;
   disk retaining means operably mounted in said housing to rotate a plurality of disks about a longitudinal axis within said housing; and
   a motor and drive means for rotating said disk retaining means, said motor being operably mounted within said housing and said drive means transmitting rotational energy from the motor to said disk retaining means;
   said drive means being operably mounted on said door, for movement therewith.

2. A disk cleaning apparatus, comprising:
   an enclosed housing having forward and rearward walls;
   a door mounted on the forward wall of said housing operable between open and closed positions;
   said door being mounted so as to move perpendicularly away from the plane of said front wall while remaining generally parallel thereto, when operated to an open position, and mounted so as to seal said housing when moved to the closed position;
   means in said housing for spraying fluid on disks selectively located within the housing;
   disk retaining means operably mounted in said housing to rotate a plurality of disks about a longitudinal axis within said housing; and
   said disk retaining means including cooperable forward and rearward portions, said forward portion being operably mounted to said door for movement therewith, and said rearward portion being operably mounted within said housing, said forward and rearward portions being cooperable to form a single rotatable cradle when said door is moved to a closed position.

3. The disk cleaning apparatus of claim 1, further comprising a drive coupler means having cooperable forward and rearward halves for selectively connecting said motor and drive means, said coupler forward half operably mounted on said door and connected to said drive means, and said coupler rearward half operably mounted in said housing and connected to said motor, said coupler halves being cooperable to transmit rotation energy from said motor to said drive means when said door is moved to the closed position.

4. The disk cleaning apparatus of claim 3, wherein said drive coupler halves are separable to prevent transmission of rotational energy when said door is moved to the open position.

5. The disk cleaning apparatus of claim 2, further comprising means for selectively locking said disk retaining means in a non-rotatable condition.

6. The disk drive apparatus of claim 2, further comprising a rack removably connected to said disk retaining means, for retaining a plurality of disks in a generally parallel and spaced-apart orientation.

7. The disk cleaning apparatus of claim 2, wherein said forward portion includes a forward plate rotatably mounted on said door and a plurality of arms projecting rearwardly therefrom, said forward portion arms being spaced apart and parallel and arranged to form a generally semi-cylindrical shape.

8. The disk cleaning apparatus of claim 7, further comprising means for selectively locking said disk retaining means in a position with said forward portion arms oriented to form the lower half of a cylinder, to receive disks therein when said door is moved to an open position.

9. The disk cleaning apparatus of claim 2, further comprising means for pneumatically operating said door between the open and closed positions.

10. A disk cleaning apparatus, comprising:
    an enclosed housing having forward and rearward walls;
    a door mounted on the forward wall of said housing operable between open and closed positions;
    means in said housing for spraying fluid on disks selectively located within the housing;
    disk retaining means operably mounted in said housing to rotate a plurality of disks;
    a motor operably mounted in said housing for rotating said disk retaining means;
    drive means mounted to said door and connected to said disk retaining means for transmitting rotational energy from said motor to said disk retaining means; and
    selectively connectable coupler means connecting said drive means and motor, for connecting said motor to said drive means when said door is in the closed position and disconnecting the motor from the drive means when said door is in the open position.

* * * * *